US012686216B2

(12) United States Patent
Chan et al.

(10) Patent No.: US 12,686,216 B2
(45) Date of Patent: Jul. 21, 2026

(54) PRINTER

(71) Applicant: Toshiba Tec Kabushiki Kaisha, Tokyo (JP)

(72) Inventors: Eugene Chan, Singapore (SG); Akira Suzuki, Mishima (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 135 days.

(21) Appl. No.: 18/642,801

(22) Filed: Apr. 22, 2024

(65) Prior Publication Data

US 2024/0375415 A1 Nov. 14, 2024

(30) Foreign Application Priority Data

May 12, 2023 (JP) ................................. 2023-079633

(51) Int. Cl.
*B41J 11/00* (2006.01)
*B41J 15/02* (2006.01)
*B41J 15/04* (2006.01)

(52) U.S. Cl.
CPC ........... *B41J 11/0095* (2013.01); *B41J 15/02* (2013.01); *B41J 15/046* (2013.01)

(58) Field of Classification Search
CPC .... B41J 11/0095; B41J 11/003; B41J 3/4075; B65H 35/002; B65H 2301/41342; B65H 2402/442; B65H 2402/46; B65H 2801/09
See application file for complete search history.

(56) References Cited

U.S. PATENT DOCUMENTS 6,609,844 B1 * 8/2003 Petteruti .................... B41J 3/36 400/613
2020/0130970 A1 4/2020 Yada

FOREIGN PATENT DOCUMENTS

JP 2002-274703 A 9/2002
JP 2020-066523 A 4/2020
JP 2020-164296 A 10/2020

OTHER PUBLICATIONS

Extended European Search Report dated Jun. 3, 2024 issued in EP Application No. 24156222.2, 9 pages.
Notice of Reasons for Refusal dated Oct. 27, 2025 issued in JP Application No. 2023-079633, with English translation, 8 pages.

* cited by examiner

*Primary Examiner* — Kristal Feggins
(74) *Attorney, Agent, or Firm* — FOLEY & LARDNER LLP

(57) ABSTRACT

A printer configured to form an image on roll paper includes a housing configured to house the roll paper and a first guide and a second guide coupled to the housing, the first guide and the second guide each being movable in a width direction of the roll paper, and the first guide being separated from the second guide in the width direction to hold the roll paper therebetween. The printer further includes a detection assembly configured to detect a position of the first guide and a position of the second guide and a controller configured to determine a width of the roll paper based on a detection result of the detection assembly.

12 Claims, 5 Drawing Sheets

1

PRINTER

CROSS-REFERENCE TO RELATED APPLICATION

This application is based upon and claims the benefit of priority from Japanese Patent Application No. 2023-079633, filed on May 12, 2023, the entire contents of which are incorporated herein by reference.

FIELD

Embodiments described herein relate generally to a printer.

BACKGROUND

In a printer that forms an image on roll paper such as plain paper or heat sensitive paper, movement in the width direction of the roll paper is restricted by paper guides. Therefore, if the roll paper is set in the printer, a user manually moves the paper guides after placing the roll paper in the printer. After the movement, the user manually performs work for setting the width of the roll paper in the printer.

The manual setting work for the paper width by the user explained above is likely to cause an error such as an input mistake. If the paper width setting is wrong, problems are likely to occur in that, for example, the printer cannot exert original performance thereof and cannot detect deterioration in printing quality and a small residual amount of the roll paper (i.e., the roll paper is almost depleted).

DETAILED DESCRIPTION

Figure 1:
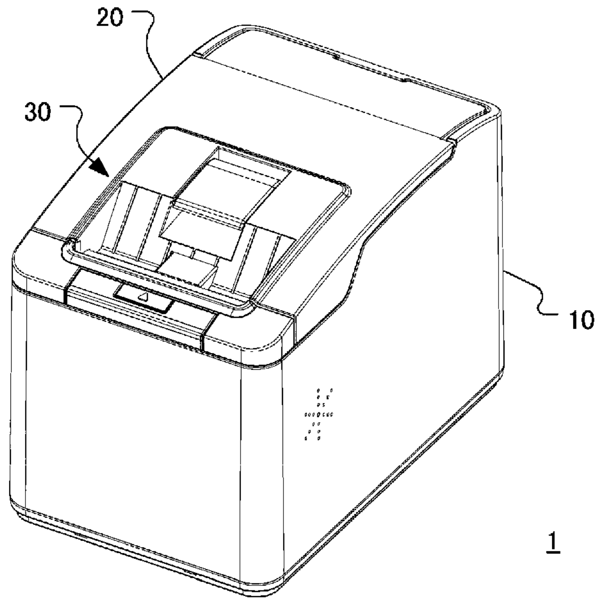
FIG. 1 is a schematic perspective view illustrating a printer according to an embodiment.

An object of embodiments is to provide a technique capable of accurately setting a paper width.

According to an embodiment, there is provided a printer that forms an image on roll paper, the printer including: a housing configured to house the roll paper; a pair of guides provided in the housing, each configured to be movable in a width direction of the roll paper, and configured to separate from each other in the width direction to hold the roll paper therebetween; a detecting unit configured to detect a position of each of the pair of guides; and a processor configured to determine width of the roll paper based on a detection result of the detecting unit.

An embodiment is explained below with reference to the drawings. In the drawings, the same components are denoted by the same reference numerals and signs.

Configuration of a Printer

Figure 2:
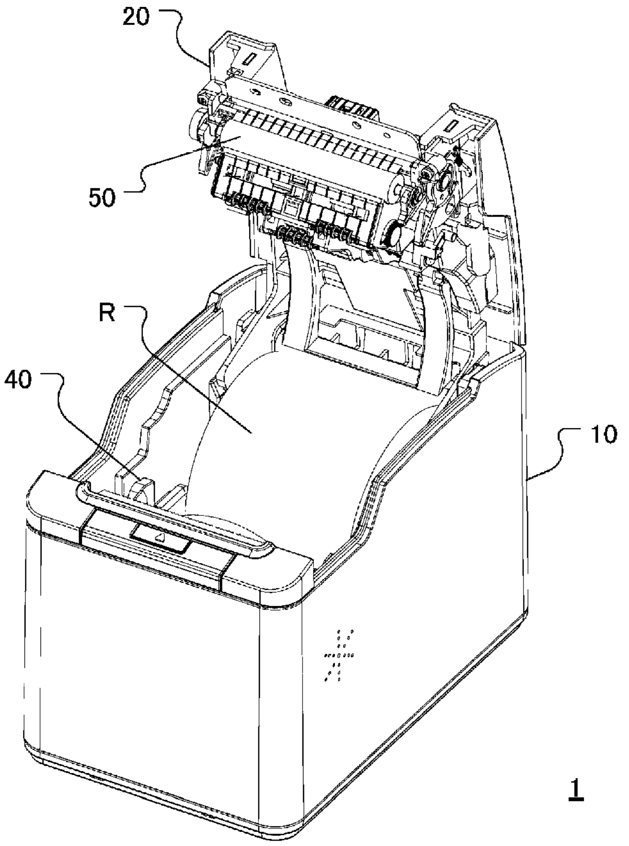
FIG. 2 is a perspective view illustrating the printer in a state in which a cover is opened.
Figure 3:
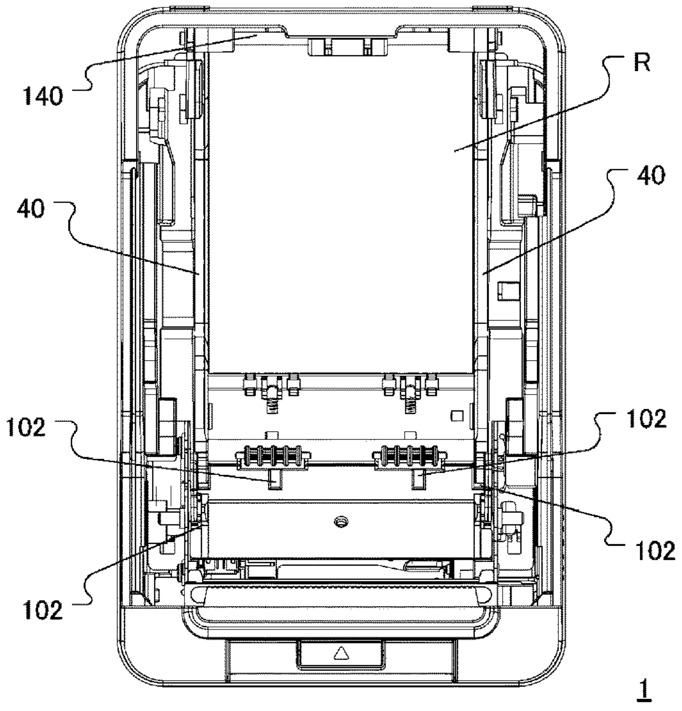
FIG. 3 is a plan view illustrating the printer.

A configuration of a printer according to this embodiment is explained. FIG. 1 is a perspective view illustrating the printer according to this embodiment. FIG. 2 is a perspective view illustrating the printer in a state in which a cover is opened, according to this embodiment. FIG. 3 is a plan view illustrating the printer according to this embodiment. Note that, in FIG. 3, a cover 20 is omitted for convenience of explanation.

A printer 1 according to this embodiment illustrated in FIGS. 1 to 3 is configured as a thermal printer that performs printing with a direct thermal recording printing scheme using continuous paper that is direct coloring paper such as heat sensitive paper. The printer 1 is, for example, a receipt printer. The printer 1 includes a housing 10 that houses roll paper R (i.e., a roll of paper) formed by the continuous paper being wound in a roll shape and a cover 20 provided to be openable and closable with respect to the housing 10. A discharge port 30 for discharging the continuous paper is formed on the upper surfaces of the housing 10 and the cover 20. Note that, in the following explanation, the left oblique downward side in the figure of the printer 1 illustrated in FIG. 1 is referred to as front of the printer 1 and the opposite side of the left oblique downward side is referred to as rear.

The housing 10 is formed in a substantially box shape that defines a housing space for housing the roll paper R. The front side of the housing 10 further projects upward compared with the rear side of the housing 10. The projecting portion forms a part of the upper surface of the printer 1. A pair of paper guides 40 respectively formed in plate shapes is provided in the housing space (e.g., an inner volume) of the housing 10. Note that, in FIG. 2, only one of the pair of paper guides 40 is illustrated, and the second paper guide 40 is visible in FIG. 3. The pair of paper guides 40 holds the roll paper R therebetween. Details of the pair of paper guides 40 are explained below.

The cover 20 is formed to be capable of covering the rear side upper surface of the housing 10. A not-illustrated pair of spindles provided at one end portion of the cover 20 is axially supported to be capable of turning in the housing 10. The cover 20 turns with the pair of spindles as an axis to thereby open and close the housing space of the housing 10 to be openable and closable.

The discharge port 30 is formed across the upper surface of the housing 10 and the front surface of the cover 20. Specifically, the discharge port 30 is formed by a cutout portion formed on the rear side of the upper surface of the housing 10 and a cutout portion formed on the front side of the upper surface of the cover 20. The discharge port 30 recesses downward to be formed as a recess. A platen roller 50 is turnably (e.g., rotatably) attached to the cover 20 below the discharge port 30.

The platen roller 50 is a feeding roller rotatably axial supported in a position facing a printing head 60 (see FIG. 10) to compress the continuous paper against the printing head 60 from the rear surface side. The platen roller 50 is driven to rotate by a platen motor 51 (see FIG. 10) to convey the continuous paper unwound from the roll paper R to be discharged from the discharge port 30.

The printing head 60 is provided below the discharge port 30 and includes a plurality of heat generating elements adjacent to each other in the width direction of the continuous paper. The printing head 60 forms an image on the continuous paper by the plurality of heat generating elements generating heat according to an input pulse wave. The continuous paper on which the image is formed by the printing head 60 is discharged from the discharge port 30. The continuous paper is cut by a cutter unit 70 (see FIG. 10) provided further on the downstream side than the platen roller 50 and the printing head 60 in a conveying direction of the continuous paper.

The cutter unit 70 (e.g., cutter) includes a fixed blade and a movable blade and advances the movable blade toward the fixed blade and retracts the movable blade with a driving device such as a motor or a solenoid. The cutter unit 70 advances the movable blade toward the fixed blade to thereby cut the continuous paper interposed between the fixed blade and the movable blade. According to the cutting, a user can acquire the cut continuous paper from the discharge port 30.

Figure 4:
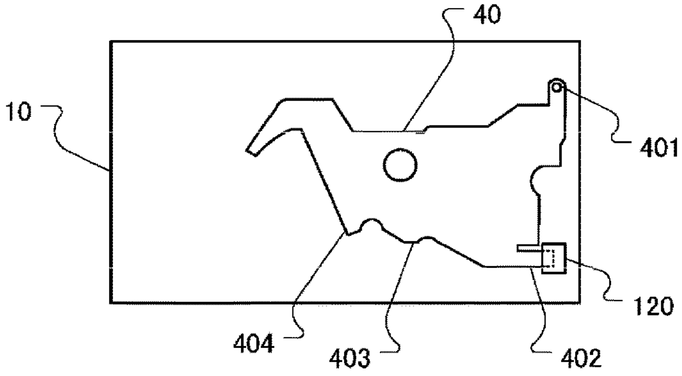
FIG. 4 is a diagram for explaining a paper guide that is in a holding state, according to the embodiment.
Figure 5:
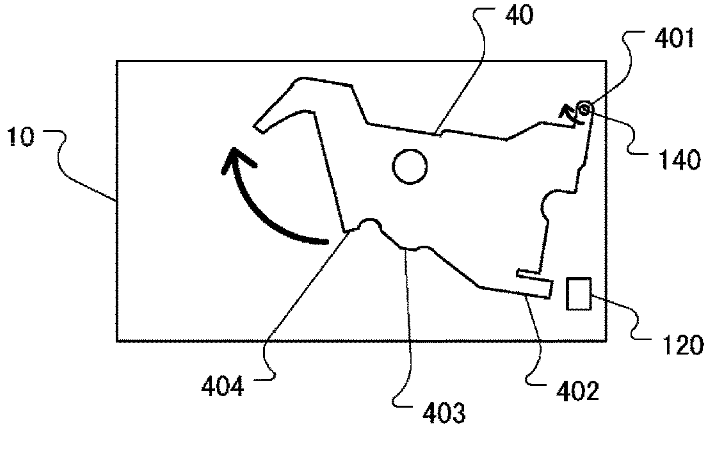
FIG. 5 is a diagram for explaining the paper guide that is in a moving state.
Figure 6:
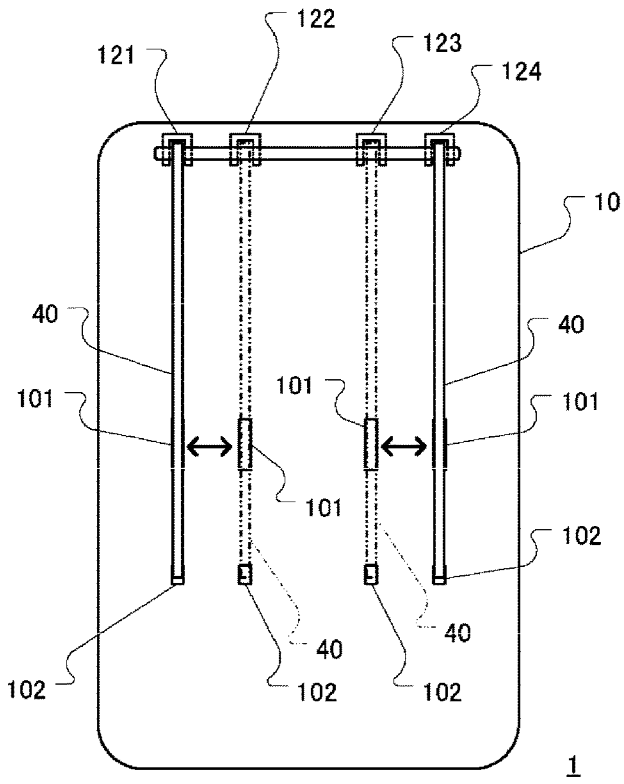
FIG. 6 is a diagram for explaining movement and fixed positions of a pair of paper guides according to the embodiment.
Figure 7:
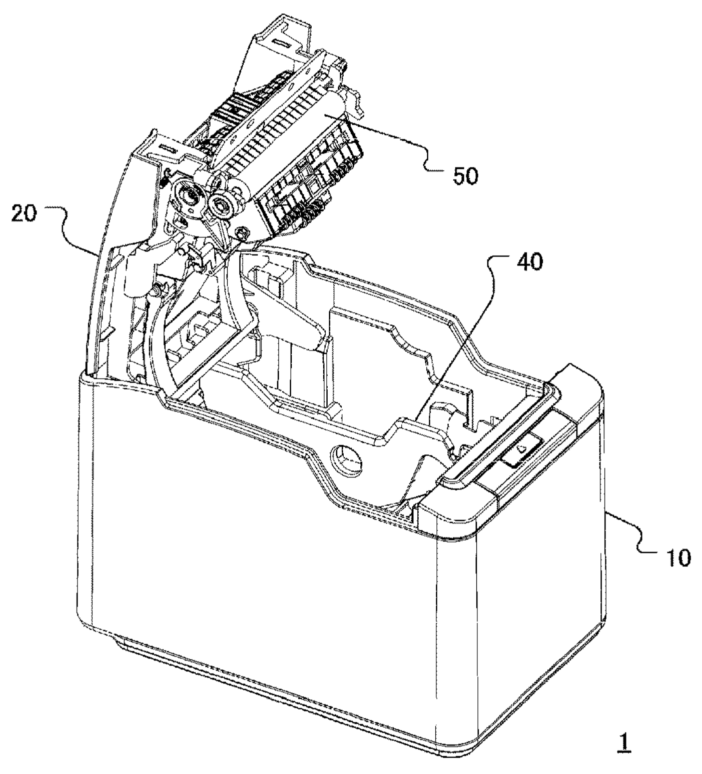
FIG. 7 is a perspective view illustrating the printer that is in a state in which the pair of paper guides is narrowed.
Figure 8:
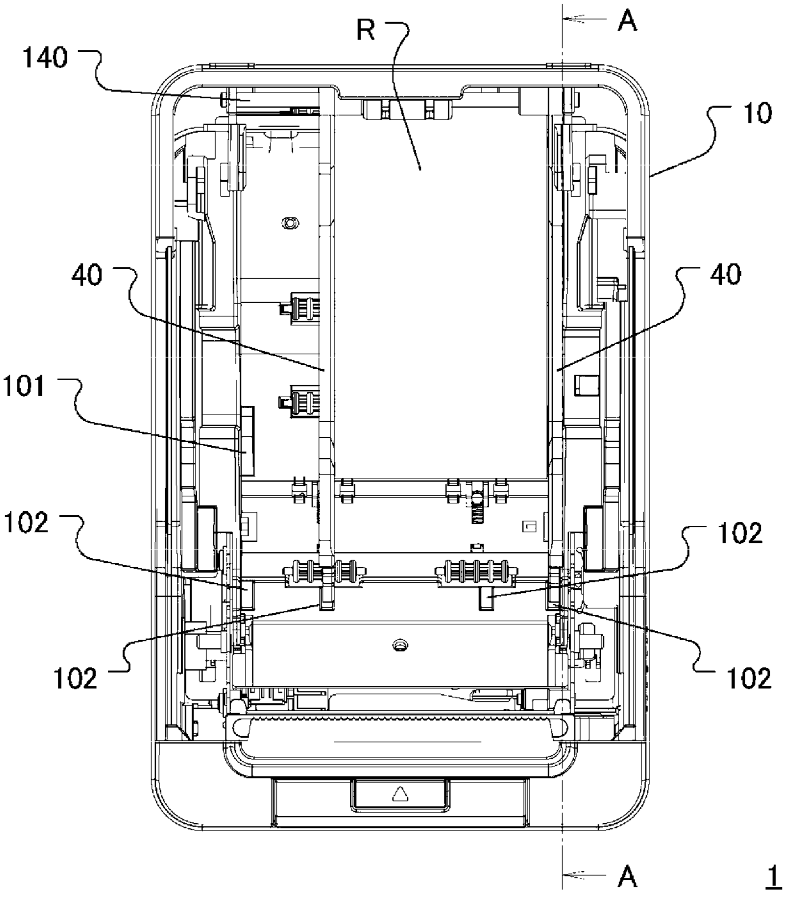
FIG. 8 is a plan view illustrating the printer in which roll paper is set in the state in which the pair of paper guides is narrowed.
Figure 9:
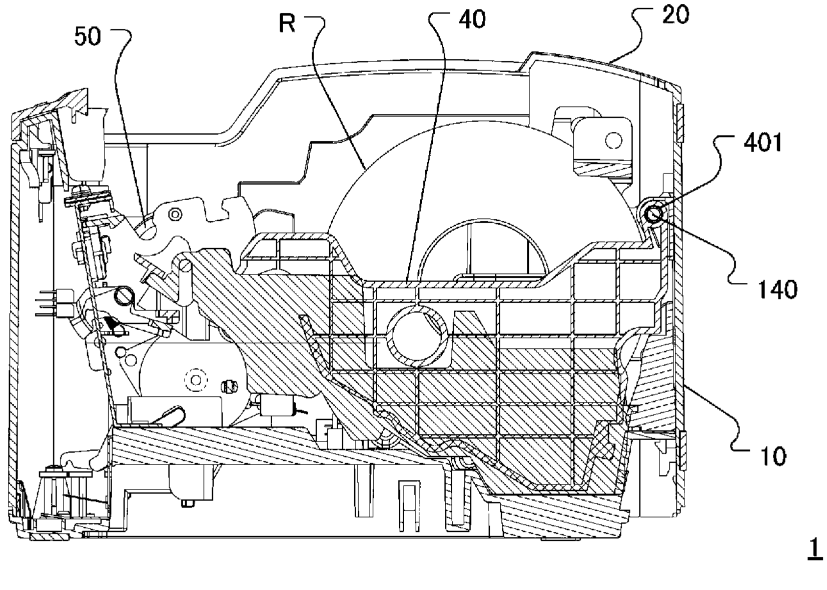
FIG. 9 is an A-A line sectional view of FIG. 8.

The pair of paper guides 40 is explained in detail below. FIG. 4 is a schematic side view illustrating the paper guide that is in a holding state, according to the embodiment. FIG. 5 is a schematic side view illustrating the paper guide that is in a moving state. FIG. 6 is a diagram for explaining movement and fixed positions of the pair of paper guides according to the embodiment. FIG. 7 is a perspective view illustrating the printer that is in a state in which the pair of paper guides according to the embodiment is narrowed. FIG. 8 is a plan view illustrating the printer in which roll paper is set in the state in which the pair of paper guides according to the embodiment is narrowed. FIG. 9 is an A-A sectional view of FIG. 8. Note that, in FIGS. 4 and 5, the left side in the figures indicates the front side of the printer 1. FIG. 6 is a plan view schematically illustrating the pair of paper guides 40. In FIG. 8, the cover 20 is omitted for convenience of explanation.

As illustrated in FIG. 3, the pair of paper guides 40 comes close to or comes into contact with the end face in the width direction (the left-right direction of FIG. 3) of the roll paper R in a state in which the roll paper R is set in the housing space. By coming close to or coming into contact with the end face, the pair of paper guides 40 holds the roll paper R therebetween such that the movement of the roll paper R in the left-right direction can be restricted (e.g., limited). The pair of paper guides 40 is respectively configured as plate-like members having the same shape and the same function extending in the front-rear direction in the housing space of the housing 10. By extending in the front-rear direction, the pair of paper guides 40 can hold, therebetween, not only the roll paper R but also the continuous paper unwound from the roll paper R.

As illustrated in FIG. 4, the paper guide 40 has a shape, the front side of which is tapered to curve to the inner side in a substantially claw shape and the rear side of which expands in the up-down direction, to correspond to, in particular, the shape of a bottom wall of the housing space of the housing 10. In other words, the paper guide 40 is formed to be capable of uniformly coming into contact with a floor surface of the housing space of the housing 10. Note that, in order to avoid a damper for continuous paper provided in the housing 10, the front distal end portion of the paper guide 40 is formed in a substantially claw shape. That is, the pair of paper guides 40 can restrict left-right direction movement of the continuous paper near the damper by reaching near the damper. In a state in which the pair of paper guides 40 is respectively in contact with the floor surface of the housing space as illustrated in FIG. 4, the pair of paper guides 40 comes into a holding state for holding the roll paper R therebetween.

A projecting piece 402 (e.g., a protrusion) projecting to the rear is formed in a rear side lower part of the paper guide 40. The projecting piece 402 is inserted into a detection space in a sensor 120 or detection area provided in the housing space of the housing 10 in the holding state illustrated in FIG. 4. Details about the sensor 120 are explained below.

A rear side upper part of the paper guide 40 projects upward. An insertion hole 401 or aperture is drilled at the distal end of the rear side upper part. A spindle 140 (e.g., a rod or linear guide) provided to extend in the left-right direction (e.g., laterally) in the housing space of the housing 10 illustrated in FIG. 3 is inserted through the insertion hole 401. The spindle 140 is inserted through the insertion hole 401, whereby the paper guide 40 is axially supported to be capable of turning with respect to the spindle 140 (e.g., rotatably coupled to the spindle 140). Therefore, as illustrated in FIG. 5, the paper guide 40 can be turned upward with the spindle 140 as an axis. The paper guide 40 can be easily turned in this way by, for example, the user gripping the front distal end part of the paper guide 40 and pulling the front distal end part upward.

If the paper guide 40 is turned upward, the projecting piece 402 is removed from the detection space of the sensor 120. In a state in which the paper guide 40 is turned upward and the projecting piece 402 is removed from the sensor 120 in this way, the paper guide 40 comes into the moving state. The pair of paper guides 40 in the moving state can relatively move to be capable of coming into contact with and separating from each other in the left-right direction along the spindle 140.

The sensor 120 is a noncontact sensor formed in a C shape in plan view and including a light projecting unit and a light receiving unit separated in the left-right direction. A space between the light projecting unit and the light receiving unit is the detection space explained above. If the projecting piece 402 is inserted between the light projecting unit and the light receiving unit, the sensor 120 transmits a detection signal to an Micro Processing Unit (MPU) 81 (see FIG. 10) explained below as a detection result (e.g., sensor data). Examples of the noncontact sensor include a photo-interrupter and a photoelectric sensor of a reflector type. Note that a contact-type sensor such as a contact-type displacement sensor may be used. However, it is preferable to use the noncontact sensor if possibility of occurrence of deficiencies due to repeated contact is considered.

In this embodiment, four sensors 120 are provided to be aligned in the left-right direction and separated from one another. The sensors 120 form a detection assembly or sensor assembly. Reference numerals 121 to 124 illustrated in FIG. 6 indicate the sensors 120 provided in positions different from one another. In the following explanation, if the positions of the sensors 120 are distinguished, the sensors 120 are referred to as sensors 121 to 124 and, if the positions of the sensors 120 are not distinguished, the sensors 120 are referred to as sensors 120. As illustrated in FIG. 6, in this embodiment, one of the pair of paper guides 40 can be moved to and positioned in the sensor 121 or the sensor 122. The other of the pair of paper guides 40 can be moved to and positioned in the sensor 123 or the sensor 124.

As illustrated in FIG. 6, a pair of engagement grooves 101 and 102 (e.g., apertures or recesses defined by the housing 10) paired to be aligned in the front-rear direction is provided on the floor surface of the housing space on the front side of the sensor 122. The engagement groove 101 is located behind the engagement groove 102 and formed long in the front-rear direction. The pair of engagement grooves 101 and 102 is provided to correspond to the front of each of the sensors 121, 123, and 124 as well. Therefore, four pairs of engagement grooves 101 and 102 in total are formed on the floor surface of the housing space. In the holding state in which the projecting piece 402 is inserted into the sensor 120 located right behind the projecting piece 402, parts of the paper guide 40 are respectively individually inserted into the pair of engagement grooves 101 and 102. Consequently, the pair of engagement grooves 101 and 102 and one paper guide 40 are respectively engaged. The paper guide 40 is restricted from moving in at least the left-right direction by the engagement. It is possible to satisfactorily maintain the holding state. In this embodiment, a protrusion 403 formed in a lower part of the guide 40 illustrated in FIGS. 4 and 5 engages in the engagement groove 101 and a protrusion 404 formed in a lower part of the guide 40 engages in the engagement groove 102.

Separation distances among the respective sensors 121 to 124 are distances corresponding to a plurality of types of the roll paper R different in widths used in the printer 1. That is, if the projecting piece 402 is inserted into any two of the sensors 121 to 124 and the pair of paper guides 40 comes into the holding state, the pair of paper guides 40 can hold the roll paper R corresponding to the separation distance between the two sensors.

For example, the separation distance between the sensor 121 and the sensor 124 is set to a distance at which 80 mm wide roll paper R can be held between the pair of paper guides 40. The separation distance between the sensor 122 and the sensor 123 is set to a distance at which 40 mm wide roll paper R can be held between the pair of paper guides 40. The separation distance between the sensor 121 and the sensor 123 and the separation distance between the sensor 122 and the sensor 124 are respectively set to distances at which 58 mm wide roll paper R can be held between the pair of paper guides 40. Since the separation distances are set as explained above, in the printer 1 in this embodiment, the four sensors 121 to 124 enable the roll paper R having the three kinds of width to be held by the pair of paper guides 40.

In FIGS. 7 to 9, as an example, a holding state in which the pair of paper guides 40 is positioned in the sensor 122 and the sensor 124 is illustrated. On the other hand, in FIGS. 2 and 3, a holding state in which the pair of paper guides 40 is positioned in the sensor 121 and the sensor 124 is illustrated. Therefore, the roll paper R illustrated in FIGS. 8 and 9 is 58 mm wide and the roll paper R illustrated in FIGS. 2 and 3 is 80 mm wide. According to FIGS. 2, 3, and 8, it is seen that both of the 58 mm wide roll paper R and the 80 mm wide roll paper R are securely held by the pair of paper guides 40. Note that, in FIG. 7, the paper guide 40 positioned in the sensor 124 is not illustrated for convenience of explanation.

As illustrated in FIG. 9, the pair of paper guides 40 is formed in a shape in which front-rear direction substantially center portions thereof recess downward. By being formed in this way, the pair of paper guides 40 can hold the roll paper R to cover the lower both end faces of the roll paper R. Therefore, the user can grip the upper both end faces of the roll paper R and can easily set the roll paper R in the housing space of the housing 10.

Configuration and Operation of a Control System

Figure 10:
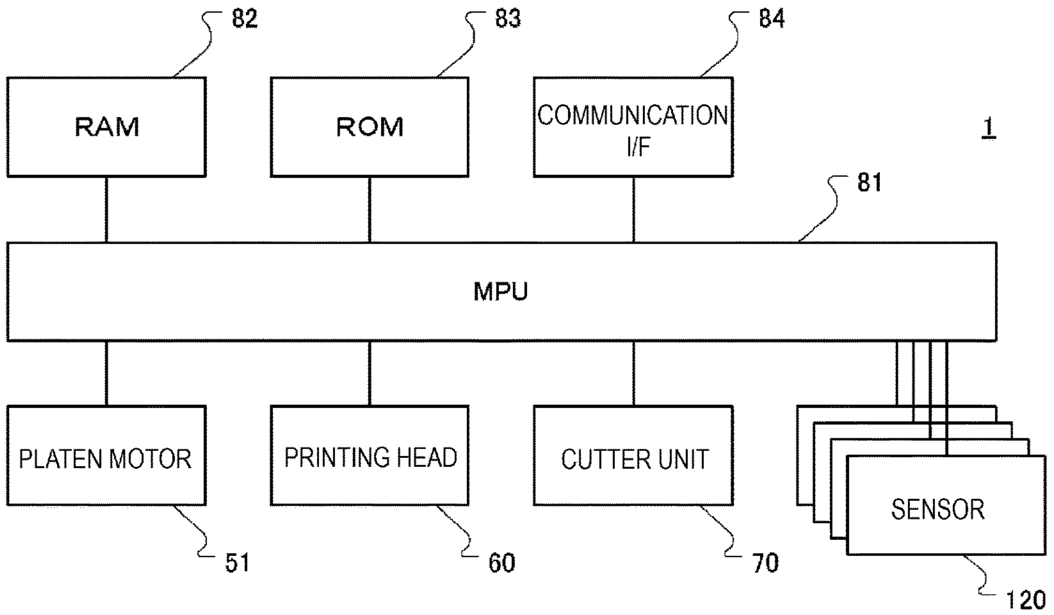
FIG. 10 is a block diagram illustrating a configuration of a control system of the printer.

A configuration and an operation of a control system of the printer according to this embodiment are explained. FIG. 10 is a block diagram illustrating the configuration of the control system of the printer according to this embodiment.

As illustrated in FIG. 10, the printer 1 includes a Random Access Memory (RAM) 82, a Read Only Memory (ROM) 83, and a communication interface (I/F) 84 besides the MPU 81, the platen motor 51, the printing head 60, the cutter unit 70, and the four sensors 120 (the sensors 121 to 124) explained above. The RAM 82, the ROM 83, and the MPU 81 may form a controller of the printer 1.

The communication I/F 84 performs communication with a host apparatus of the printer 1. The MPU 81 controls the platen motor 51, the printing head 60, and the cutter unit 70 in cooperation with the RAM 82. By controlling the platen motor 51, the printing head 60, and the cutter unit 70, the MPU 81 forms, on continuous paper, an image received from the host apparatus via the communication I/F 84 and cuts the continuous paper after conveying the continuous paper by a predetermined amount.

Further, the MPU 81 acquires detection signals from any two of the four sensors 120 and executes paper width setting processing for automatically setting width of the roll paper R based on the acquired detection signals. Note that the MPU 81 can determine from which sensors the detection signals are received. The detection signals may include information specifically indicating the sensors. The ROM 83 stores a program and data used for processing by the MPU 81. In particular, in this embodiment, the ROM 83 stores a paper width determination table. Details of the paper width determination table are explained below.

Method of Setting the Roll Paper R

If the roll paper R is set in the printer 1 explained above, first, the user opens the cover 20 and moves the pair of paper guides 40 in the housing 10 to be adjusted to the width of the roll paper R that the user desires to set. Specifically, the user shifts one of the pair of paper guides 40 from the holding state to the moving state (e.g., an adjustment configuration, a movable configuration, etc.). After the shift, to insert the projecting piece 402 into any one sensor of the four sensors 121 to 124, the user positions one paper guide 40 in the sensor and turns one paper guide 40. The user further turns one paper guide 40 downward and inserts and engages the protrusions 403 and 404 in the pair of engagement grooves 101 and 102 located in the front of the sensor.

According to the engagement, one paper guide 40 comes into the holding state (e.g., a stationary configuration or a use configuration). Thereafter, if necessary, the user shifts the other paper guide 40 from the holding state to the moving state as well, positions the other paper guide 40 in any one of the four sensors 121 to 124, and brings the other paper guide 40 into the holding state. If the pair of paper guides 40 is respectively brought into the holding state as explained above, the printer 1 according to this embodiment automatically determines the width of the roll paper R with the paper width setting processing. After bringing the pair of paper guides 40 respectively into the holding state, the user sets the roll paper R between the pair of paper guides 40.

Paper Width Setting Processing

Figure 11:
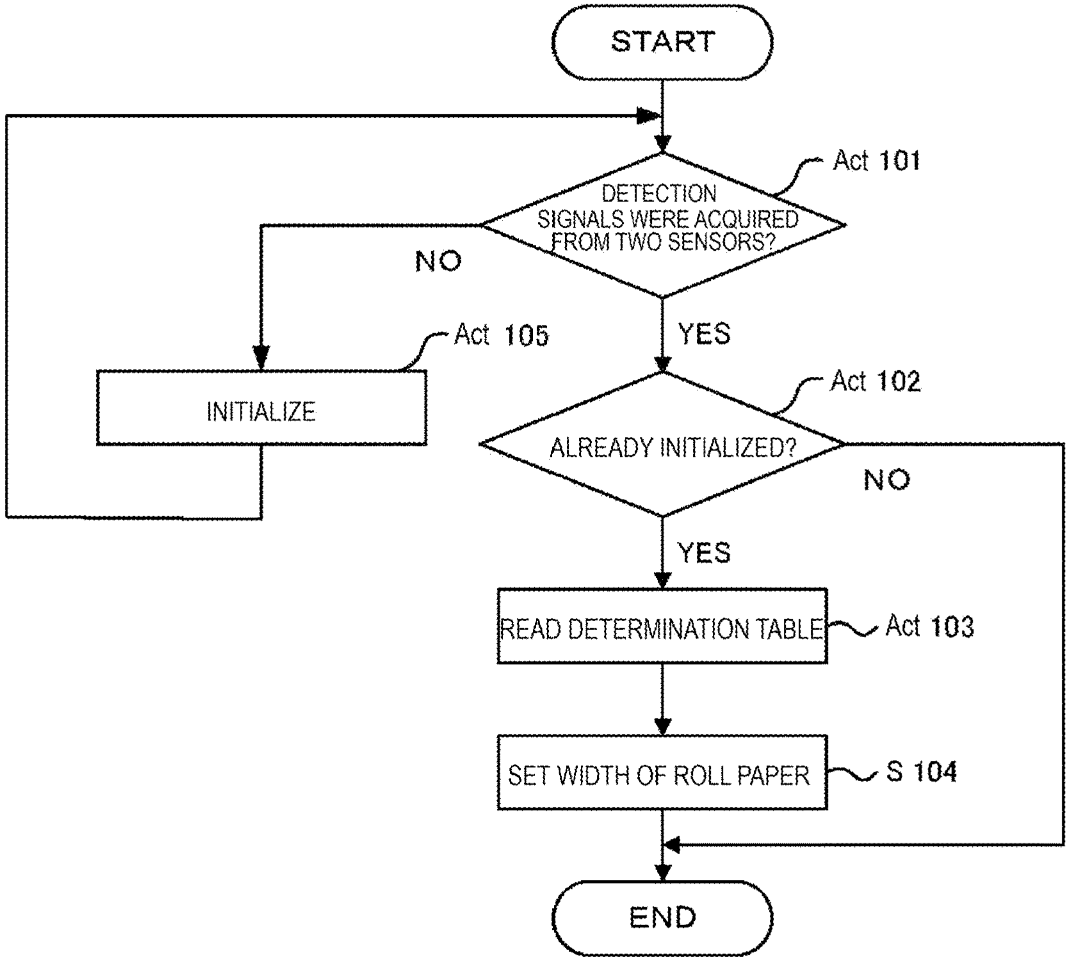
FIG. 11 is a flowchart illustrating an operation of paper setting processing according to the embodiment.

The paper width setting processing is explained. FIG. 11 is a flowchart illustrating the paper width setting processing according to this embodiment. Note that it is assumed that the processing illustrated in FIG. 11 is executed at every predetermined period after the printer 1 is turned on.

As illustrated in FIG. 11, first, the MPU 81 determines whether detection signals were received as detection results from two of the four sensors 121 to 124 (Act 101). According to the determination, it is possible to determine whether the pair of paper guides 40 is in the holding state in which the pair of paper guides 40 is respectively positioned in any ones of the four sensors 121 to 124. If determining that detection signals were acquired as detection results from the two sensors (YES in Act 101), the MPU 81 determines whether information concerning the width of the roll paper R of the printer 1 was already initialized (Act 102).

If the information was already initialized (YES in Act 102), the MPU 81 reads the paper width determination table from the ROM 83 (Act 103). After the reading, the MPU 81 determines the width of the roll paper R based on the paper width determination table and sets the width of the roll paper R used in the printer 1 (Act 104). Specifically, the MPU 81 stores the width of the roll paper R in a storage device such as the RAM 82 and sets a printing range by the printing head 60 according to the width. After the setting, the paper width setting processing at this period ends.

The paper width determination table (e.g., predetermined association information) is information in which combinations of detection signals of the four sensors 121 to 124 and widths of the roll paper are associated. For example, width 80 mm of the roll paper R is associated with a combination of the sensor 121 and the sensor 124. Similarly, width 40 mm of the roll paper R is associated with a combination of the sensor 122 and the sensor 123. Width 58 mm of the roll paper R is associated with each of a combination of the sensor 121 and the sensor 123 and a combination of the sensor 122 and the sensor 124. Therefore, by referring to the paper width determination table, the MPU 81 is capable of determining the width of the roll paper R from acquired detection results.

Note that, in the combination of the sensor 121 and the sensor 123, the roll paper R is disposed in the housing space to be closer to the left side with respect to the printer 1. Similarly, in the combination of the sensor 122 and the sensor 124, the roll paper R is disposed in the housing space to be closer to the right side with respect to the printer 1. Therefore, it is preferable that information indicating to which of the left and right directions in the housing space the roll paper R is closer is also associated with the combinations of the sensors in the paper width determination table. If the information is associated with the combinations of the sensors, the MPU 81 can change an image forming range (a printing range) by, for example, controlling the heat generating elements of the printing head 60 only in the left or right direction. By changing the image forming range, it is possible to disperse wear of the printing head 60.

Note that, if determining in the processing in Act 101 that detection signals were not acquired as detection results from the two sensors (NO in Act 101), the MPU 81 initializes information concerning the set width of the roll paper (Act 105). If detection signals were not acquired as detection results from the two sensors, at least one of the pair of paper guides 40 is in the moving state. Therefore, it is highly likely that the width of the roll paper R is changed. Accordingly, the information concerning the set width of the roll paper is initialized to prepare for setting of the width of the roll paper R at the next and subsequent periods.

If the information concerning the set width of the roll paper was not already initialized (NO in Act 102), the paper width setting processing at this period ends. This is to mean that there is no change in two detection signals acquired at the immediately preceding period of this period, that is, there is no change in the width of the roll paper R.

According to this embodiment explained above, the width of the roll paper R can be automatically set only by moving the pair of paper guides 40 and positioning the pair of paper guides 40 in the sensors 120. Therefore, it is possible to more accurately set the width of the roll paper R compared with if a person manually sets the width of the roll paper R. A considerably long time is required if the person manually sets the width of the roll paper R. However, according to this embodiment, it is possible to complete the setting in an extremely short time. Further, since the pair of paper guides 40 is configured to be capable of moving relatively to each other, it is possible to cope with roll papers R having various widths. Depending on width, it is possible to selectively move the roll paper R in the left or right direction and hold the roll paper R.

Note that, in the embodiment explained above, the four sensors 120 are explained as being provided. However, three or more sensors 120 only have to be provided such that roll papers R having at least two kinds of widths can be set.

In the paper width setting processing explained above, the information concerning the width of the roll paper R is explained as being initialized if one of the pair of paper guides 40 comes into the moving state. However, it may be determined, without performing the initialization, whether acquired two detection signals are output from the same source as a source of detection signals acquired at the last period. In this case, if the sources are the same, the paper width setting processing at the present period ends. If the sources are different, the processing shifts to the processing in Act 103. The information concerning the width of the roll paper R is updated in Act 104.

In this embodiment, the printer 1 is explained as performing printing with the direct thermal recording printing scheme. However, the printer 1 may perform printing with another scheme. The roll paper R does not need to be the heat sensitive paper. The roll paper R may be, for example, continuous paper on which a plurality of labels are continuously stuck at intervals or may be roll paper having a liner.

The embodiment is explained above. However, the embodiment is presented as an example and is not intended to limit the scope of the invention. The new embodiment can be implemented in other various forms. Various omissions, substitutions, and changes can be made without departing from the gist of the invention. The embodiment and modifications thereof are included in the scope and the gist of the invention and included in the scope of the inventions described in the claims and equivalents of the inventions.

What is claimed is:

1. A printer configured to form an image on roll paper, the printer comprising:
- a housing configured to house the roll paper;
- a first guide and a second guide coupled to the housing, the first guide and the second guide each being movable in a width direction of the roll paper, the first guide being separated from the second guide in the width direction to hold the roll paper therebetween;
- a detection assembly configured to detect a position of the first guide and a position of the second guide, the detection assembly including:
  - a first sensor configured to detect whether the first guide is in a first position associated with the first sensor; and
  - a second sensor configured to detect whether the second guide is in a second position associated with the second sensor; and a controller configured to acquire a first detection signal from the first sensor and a second detection signal from the second sensor and determine a width of the roll paper based on the first detection signal and the second detection signal.

2. The printer of claim 1, wherein the first sensor is offset from the second sensor in the width direction.

3. The printer of claim 1, wherein:

the detection assembly includes a third sensor configured to detect whether the first guide is in a third position associated with the third sensor; and the controller is configured to acquire a third detection signal from the third sensor and determine the width of the roll paper based on the first detection signal, the second detection signal, and the third detection signal.

4. The printer of claim 3, wherein the controller is configured to:

determine that the roll paper has a first width in response to activation of the first sensor and the second sensor; and determine that the roll paper has a second width different from the first width in response to activation of the third sensor and the second sensor.

5. The printer of claim 3, wherein:

the detection assembly includes a fourth sensor configured to detect whether the second guide is in a fourth position associated with the fourth sensor; and the controller is configured to acquire a fourth detection signal from the fourth sensor and determine the width of the roll paper based on the first detection signal, the second detection signal, the third detection signal, and the fourth detection signal.

6. The printer of claim 1, wherein the controller is configured to:

determine, based on the first detection signal and the second detection signal, whether the roll paper is positioned closer to a first side of the housing or a second side of the housing in the width direction; and in response to a determination that the roll paper is disposed closer to the first side, set an image forming range corresponding to the first side.

7. The printer of claim 1, wherein:

the first guide includes a protrusion; and the first sensor is configured to provide the first detection signal in response to the first sensor receiving the protrusion.

8. The printer of claim 1, wherein the first guide includes a protrusion and the housing defines a groove that receives the protrusion to limit movement of the first guide.

9. The printer of claim 1, further comprising a printing head configured to form the image on the roll paper, wherein the controller is configured to vary operation of the printing head based on the determined width.

10. A printer configured to form an image on roll paper, the printer comprising:

a housing;

a first guide movable laterally relative to the housing between a first position and a second position;

a second guide offset laterally from the first guide and movable laterally relative to the housing between a third position and a fourth position;

a first sensor configured to provide first sensor data related to a position of the first guide;

a second sensor configured to provide second sensor data related to a position of the second guide;

a third sensor configured to provide third sensor data indicating whether the first guide is in the first position; and a controller configured to determine a distance between the first guide and the second guide based on the first sensor data, the second sensor data, and the third sensor data.

11. The printer of claim 10, further comprising a fourth sensor configured to provide fourth sensor data indicating whether the second guide is in the third position; and the controller is configured to determine the distance between the first guide and the second guide based on the first sensor data, the second sensor data, the third sensor data, and the fourth sensor data.

12. A printer configured to form an image on roll paper, the printer comprising:

a housing configured to house the roll paper, the housing defining a first groove, a second groove, a third groove, and a fourth groove;

a first guide defining a first aperture and including a first protrusion;

a second guide defining a second aperture and including a second protrusion; and a spindle extending through the first aperture and the second aperture and coupling the first guide and the second guide to the housing, the first guide being movable along the spindle between a first position in which the first protrusion is received within the first groove and a second position in which the first protrusion is received within the second groove, and the second guide being movable along the spindle between a third position in which the second protrusion is received within the third groove and a fourth position in which the second protrusion is received within the fourth groove.

* * * * *